US009952829B2

(12) United States Patent
Klein et al.

(10) Patent No.: US 9,952,829 B2
(45) Date of Patent: Apr. 24, 2018

(54) BINARY FUSED MULTIPLY-ADD FLOATING-POINT CALCULATIONS (71) Applicant: INTERNATIONAL BUSINESS MACHINES CORPORATION, Armonk, NY (US)

(72) Inventors: Michael Klein, Schoenaich (DE); Klaus M. Kroener, Ehningen (DE); Cédric Lichtenau, Stuttgart (DE); Silvia Melitta Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/011,735

(22) Filed: Feb. 1, 2016

(65) Prior Publication Data

US 2017/0220318 A1 Aug. 3, 2017

(51) Int. Cl.
G06F 7/485 (2006.01)
G06F 7/487 (2006.01)
G06F 7/483 (2006.01)
G06F 7/544 (2006.01)
G06F 5/01 (2006.01)

(52) U.S. Cl.
CPC ............. *G06F 7/4876* (2013.01); *G06F 5/01* (2013.01); *G06F 5/012* (2013.01); *G06F 7/483* (2013.01); *G06F 7/485* (2013.01); *G06F 7/5443* (2013.01); *G06F 2207/483* (2013.01)

(58) Field of Classification Search
CPC ................................ G06F 7/5443; G06F 7/57
USPC ........................................ 708/501, 523, 603
See application file for complete search history.

(56) References Cited

U.S. PATENT DOCUMENTS

| | | | | | |
|---|---|---|---|---|---|
| 4,969,118 A | * | 11/1990 | Montoye | ............... | G06F 7/5443 708/501 |
| 5,241,493 A | * | 8/1993 | Chu | ...................... | G06F 7/5443 708/501 |
| 5,375,078 A | * | 12/1994 | Hrusecky | .............. | G06F 7/5443 708/501 |
| 5,751,621 A | * | 5/1998 | Arakawa | ............... | G06F 7/5443 708/211 |
| 7,392,270 B2 | * | 6/2008 | Dhong | .................... | G06F 5/012 708/209 |
| 8,606,840 B2 | * | 12/2013 | Ahmed | ................... | G06F 7/483 708/523 |
| 8,671,129 B2 | | 3/2014 | Brooks et al. | | |
| 8,892,619 B2 | | 11/2014 | Galal et al. | | |

(Continued)

OTHER PUBLICATIONS

J.D. Bruguera and T. Lang, "Floating-Point Fused Multiply-Add: Reduced Latency for Floating-Point Addition," Proceedings of the 17th IEEE Symposium on Computer Arithmetic, pp. 42-51, 2005.*

(Continued)

*Primary Examiner* — Matthew Sandifer
(74) *Attorney, Agent, or Firm* — Heslin Rothenberg Farley & Mesiti P.C.

(57) ABSTRACT

A binary fused multiply-add floating-point unit configured to operate on an addend, a multiplier, and a multiplicand. The unit is configured to receive as the addend an unrounded result of a prior operation executed in the unit via an early result feedback path; to perform an alignment shift of the unrounded addend on an unrounded exponent and an unrounded mantissa; as well as perform a rounding correction for the addend in parallel to the actual alignment shift, responsive to a rounding-up signal.

17 Claims, 8 Drawing Sheets

(56) References Cited

U.S. PATENT DOCUMENTS

| | | | |
|---|---|---|---|
| 8,977,670 B2 | 3/2015 | Brooks et al. | |
| 8,990,282 B2 | 3/2015 | Lutz | |
| 2006/0179097 A1* | 8/2006 | Fleischer | G06F 7/483 |
| | | | 708/495 |
| 2012/0233234 A1* | 9/2012 | Brooks | G06F 7/49947 |
| | | | 708/521 |
| 2014/0067895 A1 | 3/2014 | Wang | |
| 2014/0188966 A1 | 7/2014 | Galal et al. | |

OTHER PUBLICATIONS

R.M. Jessani and M. Putrino, "Comparison of Single- and Dual-Pass Multiply-Add Fused Floating-Point Units," IEEE Transactions on Computers, vol. 47, pp. 927-937, 1998.*

R.V.K. Pillai, S. Y. A. Shah, A. J. Al-Khalili, D. Al-Khalili, "Low Power Floating Point MAFs—A Comparative Study", Sixth International Symposium on Signal Processing and its Applications, vol. 1, pp. 284-287, 2001.*

S. Galal and M. Horowitz, "Latency Sensitive FMA Design," 20th IEEE Symposium on Computer Arithmetic (ARITH), 2011.*

Klein, Michael et al., "Binary Fused Multiply-Add Floating-Point Calculations," U.S. Appl. No. 15/197,290, filed Jun. 29, 2016, pp. 1-43.

List of IBM Patents or Patent Applications Treated as Related, Jul. 15, 2016, pp. 1-2.

Galal, Sameh et al., "Latency Sensitive FMA Design," 2011 $20^{th}$ IEEE Symposium on Computer Arithmetic, Jul. 2011, pp. 129-138.

* cited by examiner

BINARY FUSED MULTIPLY-ADD FLOATING-POINT CALCULATIONS

BACKGROUND

Aspects of the present invention relate in general to data processing systems, and in particular, to performing binary fused multiply-add floating-point calculations.

The IEEE-754-2008 Standard for Binary Floating Point Arithmetic, published in 2008, specifies a floating point data architecture that is commonly implemented in computer hardware, such as floating point processors having multipliers. The format consists of a sign, an unsigned biased exponent, and a significand. The sign bit is a single bit and is represented by an "S". The unsigned biased exponent, represented by an "e", is, e.g., 8 bits long for single precision, 11 bits long for double precision and 15 bits long for quadruple precision. The significand is, e.g., 24 bits long for single precision, 53 bits long for double precision and 113 bits long for quadruple precision. As defined by the IEEE-754-2008 standard, the most significant bit of the significand, i.e. the so called implicit bit, is decoded out of the exponent bits.

To improve floating-point arithmetic processing, most modern processors use a process called the fused-multiply-add (in the following abbreviated as FMA) process to combine a floating point multiplication operation, e.g., A*B, and a floating point addition operation, e.g., +C, for execution as a single instruction, e.g., A*B+C, where A, B, C are operands of the multiplication product A*B and the sum of C and the product. By performing two operations in a single instruction, the FMA process reduces overall execution time. The FMA process also provides improved precision because rounding need only be performed after both the multiplication and addition operations are performed at full precision. For instance, there is only one rounding error instead of two.

In floating point processors, one central area is the multiplier array. The multiplier array is used to do multiplication of two numbers. Usually state-of-the-art Booth's encoding with radix 4 is employed, which is a commonly used fast multiplication algorithm. This reduces the number of product terms that need to be summed up to n/2+1, where n is the number of bits per operand. The summation is done using a carry-save-adder circuitry which allows processing of all bits in parallel, as opposed to the normal addition where the carry-out of the lower bit position is chained to the next higher position, which is performed usually by a carry-propagate-adder circuitry. The circuitry that does this summation is known in the art as a reduction tree. At the end of the reduction tree, there remain two terms, the sum term and the carry term, which represent a summation part of information and a carry part of information, respectively. These terms finally are added with the aligned addend. Again, a carry-save-addition is performed here. Finally, only two terms remain, also a sum term and a carry term, and these two terms are added using the carry-propagate-adder to generate one final result.

Analytics applications, especially when running on big data amounts, are very compute intensive. Their main data types are binary floating-point. This includes commercially available analytics software, like ILOG, SPSS, Cognos, Algo, and many specialized analytics packages for the insurance and banking sectors.

Many mobile applications require location detection routines, which also are floating-point intensive calculations. Performance of these routines are key in emerging sectors, like telematics, which combines mobile input with database queries and insurance analytics codes and has realtime requirements.

For both areas, the latency and throughput of the floating-point unit (FPU) greatly matters for the performance of the applications. For fraud detection, for example, the FPU performance is key in whether the detection is near realtime or not.

The IEEE 754-2008 standard makes FMA (fused-multiply-add, i.e. A*B+C) mandatory for modern floating-point units. Since introduction of the IEEE 754-2008 standard, there is great competition for the fastest FPU with FMA support.

US 2014/0188966 A1 and similarly U.S. Pat. No. 8,892,619 B2, each of which is hereby incorporated herein by reference in its entirety, disclose a floating-point fused multiply-add (FMA) unit embodied in an integrated circuit. The FMA unit includes a multiplier circuit with floating point inputs A and C and floating point output A*C, and an adder circuit connected to the output of the multiplier circuit. The adder circuit adds the floating point output A*C to a floating point input B producing a result A*C+B. The adder circuit includes an exponent difference circuit implemented in parallel with the multiplier circuit, a close path circuit implemented after the exponent difference circuit, a far path circuit implemented after the exponent difference circuit, a 2:1 multiplexer (Mux) circuit connected to outputs of the close path circuit and the far path circuit and a rounder circuit connected to an output of the 2:1 multiplexer circuit. The FMA unit also includes accumulation bypass circuits forwarding an unrounded output of the 2:1 multiplexer circuit to inputs of the close path circuit and the far path circuit, and forwarding an exponent result in a carry save format to an input of the exponent difference circuit. Also included in the FMA unit is a multiply-add bypass circuit forwarding the unrounded output of the 2:1 multiplexer circuit to the floating point inputs A and C of the multiplier circuit. According to the disclosures of US 2014/0188966 A1 and U.S. Pat. No. 8,892,619 B2 it is required that the rounding correction for the B operand (addend) happens before the addend enters the alignment shifter. The accumulation bypass circuits are staggered with respect to each other such that the exponent data path starts earlier than the mantissa data path and an exponent result is calculated earlier than a mantissa result in a carry save format to be forwarded for a next dependent calculation. The far path circuit combines incrementing with a shifting and addition data path. The unrounded output is right padded with ones in case of incrementing before being fed to a shifter or adder, and circuitry in the adder circuit uses carry propagation as if the unrounded result had been incremented before shifting and addition.

Thus, US 2014/0188966 A1 discloses a fused multiply-add on a cascaded multiply-add pipeline. The FMA unit requires a special floating point adder structure for forwarding an unrounded output of the 2:1 multiplexer to the floating point input A and of the multiplier circuit.

U.S. Pat. No. 8,671,129 B2, hereby incorporated herein by reference in its entirety, discloses a processing unit for performing a multiply operation in a multiply-add pipeline. To reduce the pipeline latency, the unrounded result of a multiply-add operation is bypassed to the inputs of the multiply-add pipeline for use in a subsequent operation. If it is determined that rounding is required for the prior operation, then the rounding occurs during the subsequent operation. During the subsequent operation, a Booth encoder not utilized by the multiply operation outputs a rounding correction factor as a selection input to a Booth multiplexer not utilized by the multiply operation. When the Booth multiplexer receives the rounding correction factor, the Booth multiplexer outputs a rounding correction value to a carry save adder (CSA) tree, and the CSA tree generates the correct sum from the rounding correction value and the other partial products.

The processing unit disclosed in U.S. Pat. No. 8,671,129 B2, works on a fused multiply-add algorithm. U.S. Pat. No. 8,671,129 B2 describes performing the correction on multiplier inputs as well as necessary modifications of the Booth structure. However, it does not describe how to apply a rounding correction to the addend.

The FMA unit design, disclosed in US 2014/0188966 A1, requiring a special adder structure, consisting of a far and close path, is also described in the publication by Sameh Galal, Mark Horowitz, "Latency Sensitive FMA Design", published in 2011 in the 20th IEEE Symposium on Computer Arithmetic, which is hereby incorporated herein by reference in its entirety, applied to a cascaded fused multiply-add pipeline.

U.S. Pat. No. 8,990,282 B2, which is hereby incorporated herein by reference in its entirety, discloses a fused multiply add floating point unit that includes multiplying circuitry and adding circuitry. The multiplying circuitry multiplies operands B and C having N-bit significands to generate an unrounded product B*C. The unrounded product B*C has an M-bit significand, where M>N. The adding circuitry receives an operand A that is input at a later processing cycle than a processing cycle at which the multiplying circuitry 4 receives operands B and C. The adding circuitry 8 commences processing of the operand A after the unrounded product B*C is generated by the multiplying circuitry 4. The adding circuitry 8 adds the operand A to the unrounded product B*C and outputs a rounded result A+B*C.

Thus, in U.S. Pat. No. 8,990,282 B2 in case of a fused multiply add operation, the multiplier is forwarding an unrounded product to the adder part, being a specialty of a cascaded multiply and add design. Further, in a second kind of forwarding, a rounded result is forwarded back to the A input, i.e. the addend. The result provided by the disclosed multiply add unit is always fully rounded; this can be the result of a multiply, an add, a subtract, or a multiply-add operation. The operands received by the disclosed unit are also fully rounded. There is no unrounded forwarding of results from a prior operation to an operand of a subsequent operation.

U.S. Pat. No. 8,977,670 B2, which is hereby incorporated herein by reference in its entirety, discloses implementing an unfused multiply-add instruction within a fused multiply-add pipeline. The system includes an aligner having an input for receiving an addition term, a multiplier tree having two inputs for receiving a first value and a second value for multiplication, and a first carry save adder (CSA), wherein the first CSA may receive partial products from the multiplier tree and an aligned addition term from the aligner. The system includes a fused/unfused multiply add (PUMA) block which receives the first partial product, the second partial product, and the aligned addition term, wherein the first partial product and the second partial product are not truncated. The PUMA block performs an unfused multiply add operation or a fused multiply add operation using the first partial product, the second partial product, and the aligned addition term, e.g., depending on an opcode or mode bit. Forwarding of a result of an operation back into a next operation is only possible from a multiply to the input of an add operation. The forwarded product is in an intermediate not normalized format. For the unfused multiply-add, the unrounded and unnormalized product gets internally in the FMA pipeline passed (forwarded) to the add operation, the product will require a rounding correction. However, the forwarding is very limited: it is only from the product to one operand of the addition which does not undergo alignment. There is no unrounded forwarding from an add or multiply-add to any input operand of a subsequent operation, and there is no unrounded forwarding from the product to the add term which undergoes the alignment shift.

SUMMARY

Shortcomings of the prior art are overcome and additional advantages are provided through the provision of a unit configured to operate on an addend, a multiplier, and a multiplicand and configured to perform a method. The method includes receiving as the addend an unrounded result of a prior operation executed in the unit via an early result feedback path; performing an alignment shift of the addend on an unrounded exponent and an unrounded mantissa; and performing a rounding correction for the addend in parallel to the alignment shift, the rounding correction being enabled by a rounding-up signal.

Methods, systems and computer program products relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of aspects of the invention. Moreover, the drawings are intended to depict only typical embodiments of aspects of the invention, and therefore, should not be considered as limiting the scope of aspects of the invention.

The illustrative embodiments described herein provide a unit, method, system and computer program product for performing binary fused multiply-add floating-point calculations. The illustrative embodiments are sometimes described herein using particular technologies only as an example for the clarity of the description.

Referring to FIGS. 1 to 9, the illustrative embodiments may be used for a binary fused multiply-add floating-point unit 10, configured to operate on an addend 82, a multiplier 70, and a multiplicand 72. The FMA unit comprises, for instance, means for receiving as the addend 82 an unrounded result of a prior operation executed in the unit via an early result feedback path 76; means for performing an alignment shift of the unrounded addend 82 on an unrounded exponent and an unrounded mantissa 88; as well as means for performing a rounding correction for the addend 82 in parallel to the actual alignment shift, the means being responsive to an enabling by a rounding-up signal 89.

Figure 1:
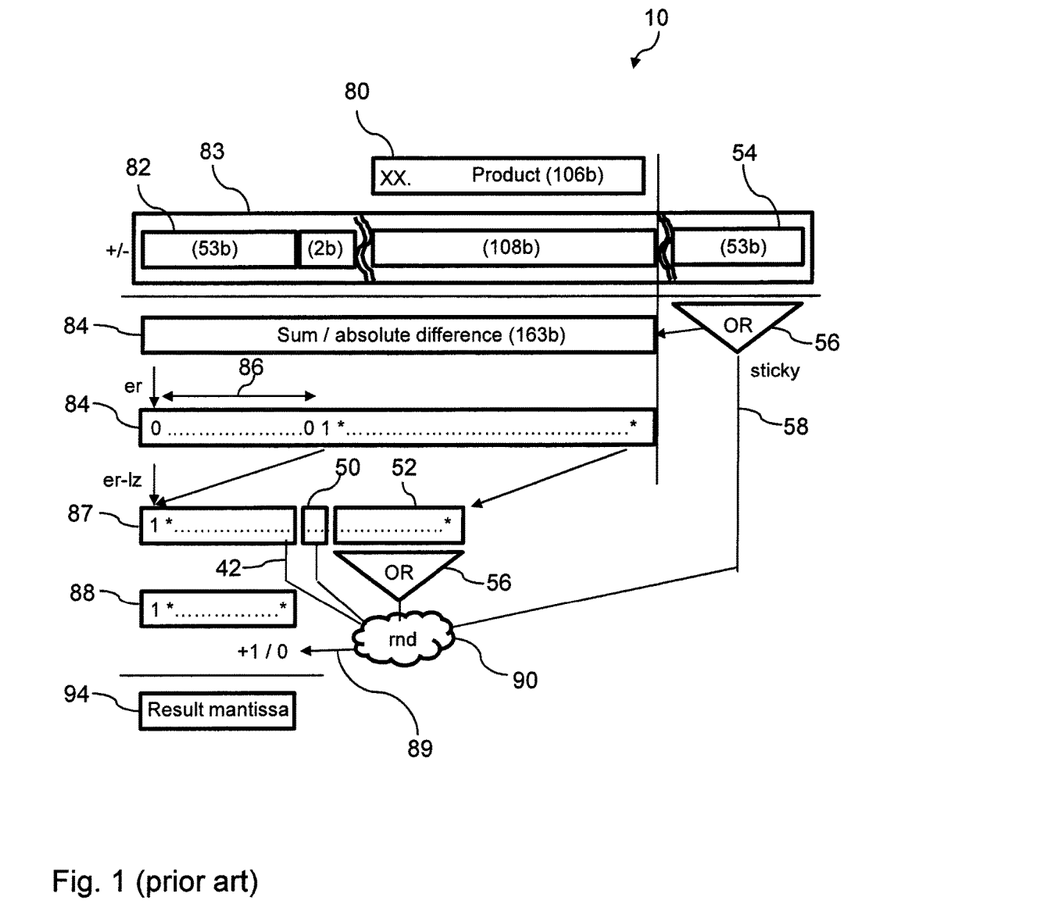
FIG. 1 a concept of an FMA unit according to state of the art.

For explanation of an FMA process, FIG. 1 depicts a concept of an FMA unit 10 according to state of the art. FIG. 1 shows part of a 64b binary floating point unit (FPU) 10 based on a fused multiply add operation (FMA) according to state of the art. The multiplication and alignment stage of the FMA unit 10 is not shown in detail. State of the art binary FPUs are based on an FMA structure to support the IEEE-754-2008 standard in an efficient and high performing manner. The basic operation of an FMA operation is: R=A*B+C, where R is the result of the FMA operation, and A, B, C are floating point numbers.

The FMA operation is executed in the following steps, as is schematically illustrated in FIG. 1:

After unpacking the operands from the IEEE-754-2008 format into the internal format, the multiplication A*B is performed in order to get a product 80 (106 bit wide) and in parallel aligning of the addend 82 relative to the product 80 in a possible range of 163 bit is performed, with a 53 bit wide field of sticky bits 54. The alignment shift gets saturated. The sticky bit field 54 gets compressed into a single sticky bit 58 by an OR tree 56. The adder computes a sum or an absolute difference 84 (163 bit wide) of the product 80 and the aligned addend 83, taking the sticky bit into account. The mantissa of the operands and result are in sign-magnitude representation. The exponent of the result is referenced with er. In parallel to the adder, the number of leading zeros lz in the adder result 86 gets anticipated by a leading-zero-anticipator. The normalizer normalizes the mantissa by shifting out the leading zeroes to get the value 87, and adjusts the exponent accordingly by subtracting the number of leading zeroes, in order to result in er-lz. The rounder 90 computes the rounding decision, resulting in a rounding-up signal 89 which indicates whether the fraction is to be incremented by 1 or not, based on the sign, sticky bits 52 and 58, guard bit 50, least significant bit 42, and rounding mode. The rounder 90 also performs the increment of the fraction 88 as needed in order to get the result mantissa 94, performs range checks and applies a post rounding correction if needed. The result 94 is then packed into the IEEE-754-2008 format.

In case of unrounded forwarding, the result 88 gets forwarded to a dependent operation after the normalization but prior to the rounding step. In case that the rounding decision, represented by the rounding-up signal 89, indicates that the rounder 90 is to perform an increment, the for-warded fraction is one unit of least precision (ulp) too small. Thus, correction terms are used. This is indicated by also forwarding the rounding-up signal 89 to the new operation.

Figure 2:
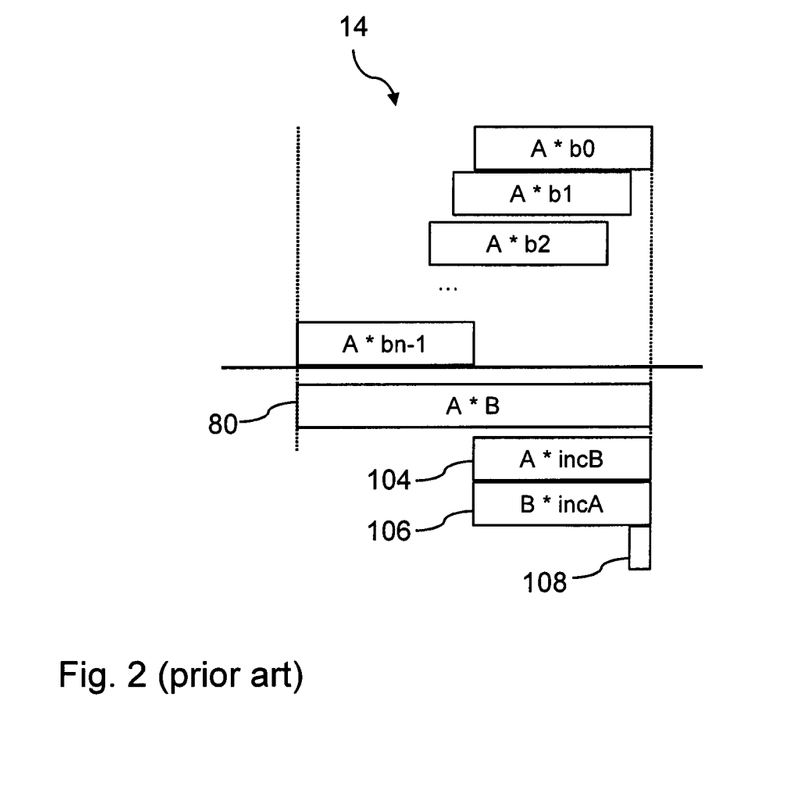
FIG. 2 a data flow for unrounded forwarding into product terms according to state of the art.

Performing a rounding correction for the product terms A and B, as is already realized in the state of the art, is shown in FIG. 2, where a data flow for unrounded forwarding into product terms according to the state of the art is depicted. In this case, for operations A*B+C or A*B−C, for the unrounded forwarding into product terms A, B, the rounding correction is always performed at a fixed position and as a positive correction term:

(A+incA)*(B+incB)=A*B+A*incB+B*incA+ incA*incB, where incA and incB are the increment values for the product terms A and B. In case of unrounded forwarding into the multiplier and/or multiplicand, the increment values incA and incB can be derived from the rounding-up signal 89 of the sourcing, prior operation.

In FIG. 2, the different correction terms A*incB 104, B*incA 106, incA*incB 108, that are to be added to the product A*B 80, which has been obtained by the multiplier tree 14 of a Booth multiplier stage, are shown.

For unrounded forwarding into the addend C, the addend is shifted relative to the product 80, which results in shifting the correction term as well. The addend C is added or subtracted, which means that the rounding correction is +1 or −1 at the C ulp position.

Figure 3:
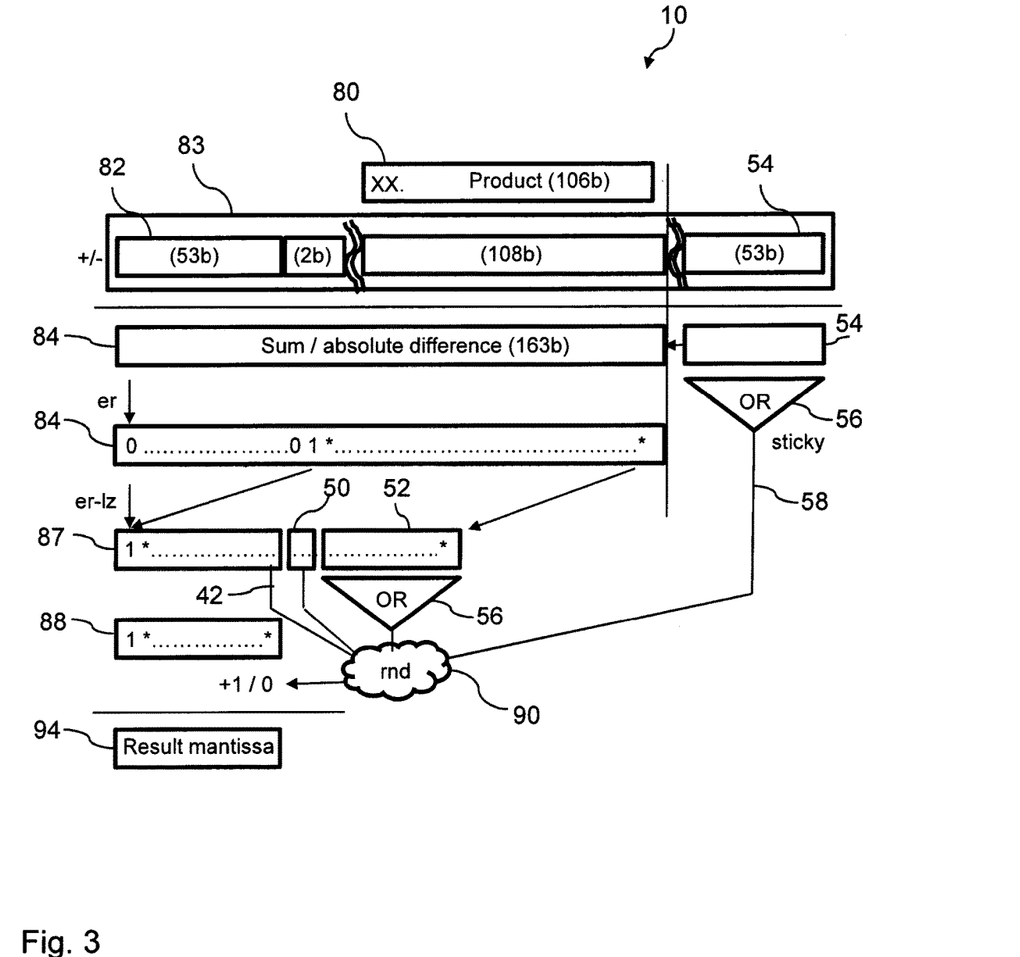
FIG. 3 a data flow of a modified FMA unit according to an embodiment of the invention.

In FIG. 3, a data flow of a modified FMA unit 10 according to an embodiment of the invention is depicted. Contrary to the FMA unit 10 shown in FIG. 1, the sum or absolute difference 84 is calculated on all bits, including the sticky bits 54 of the aligned addend 83. The sticky logic feeding the adder and computing the sticky bit 58 for this purpose is to be adjusted accordingly.

Figure 4A:
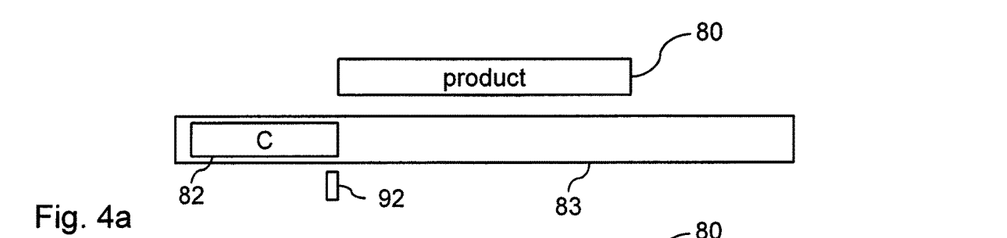
FIGS. 4a-4c three rounding correction situations for effective addition of an addend according to an embodiment of the invention.
Figure 4B:
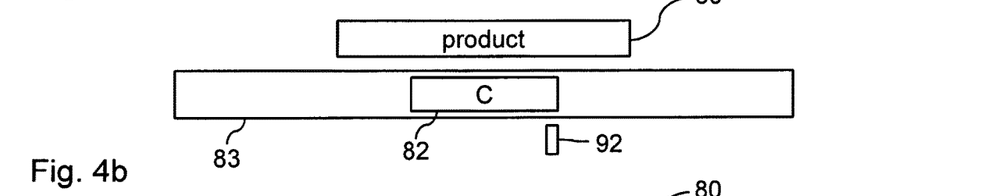
Figure 4C:
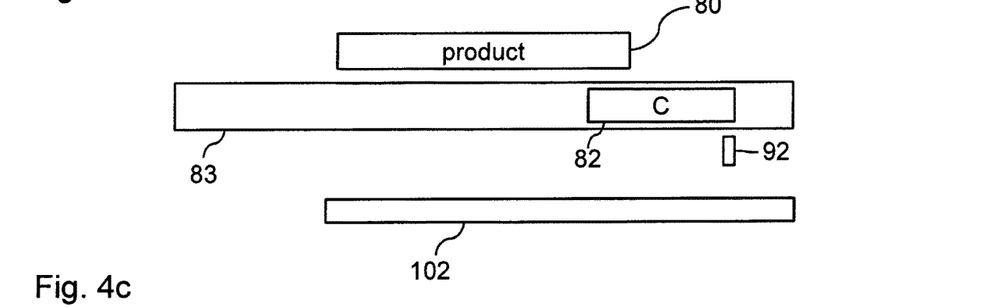

FIGS. 4a-4c illustrates three rounding correction situations for effective addition of an addend 82 according to an embodiment of the invention. For an effective addition of an addend 82, the rounding correction 92 is added and may be calculated according to:

S=P+C+rC, where S is an effective sum, P is the mantissa of a product term 80, C is the mantissa of an aligned addend 83 and rC is the correction term 92. Then, rC may be calculated as:

rC=0 or rC=1*2−52*2(ec−ep) for double precision calculations, where ec and ep are the exponents of the addend 82 and product 80, respectively. The rounding correction 92, rC, is aligned in the same way as the addend C, which means it is aligned to the least significant bit of C. The position of rC for alignment can be generated by decoding the aligner shift amount.

In the depicted situation in FIG. 4a, the exponent of the addend 82 is much larger than the exponent of the product 80; in the situation in FIG. 4b, the exponent of addend 82 is a bit smaller than the exponent of the product 80 so that the product mantissa fully overlaps the addend mantissa; and in the situation in FIG. 4c, the exponent of the addend 82 is much smaller than the exponent of the product 80, such that the product mantissa at most partially overlaps with the addend mantissa. The bar 102 shows the potential range for shifting the correction term 92.

Figure 5:
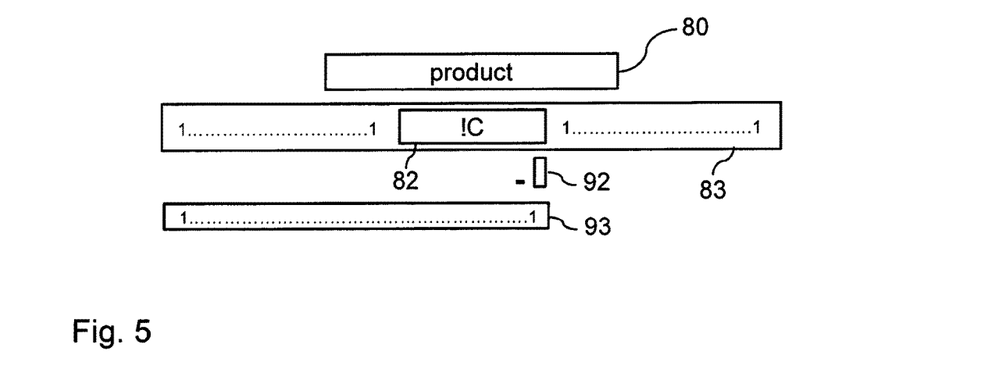
FIG. 5 a rounding correction situation for effective subtraction of an addend according to an embodiment of the invention.

FIG. 5 illustrates a rounding correction situation for effective subtraction of an addend 82 according to an embodiment of the invention. For an effective subtraction of an addend 82, the addend 82 can be larger or smaller than the product 80, thus a difference D may be calculated without a rounding correction according to:

$D=|P-C|=P-C=P+!C+ulp$, if $P>C$, else $D=-(P-C)=!(P+!C)$, where !C is the negation of C and where ulp is the unit in last place of the difference D.

Further the rounding correction 92 may be calculated according to:

$$D=|P-(C+rC)|=P-C-rC=(P-rC)+!C+\text{ulp},$$

if P>C+rC, else $$D=-(P-C-rC)=!((P-rC)+!C).$$

In FIG. 5 the remaining bits in the field of the aligned addend 83 are padded with 1 as part of inverting the whole aligned addend 83. The correction term 92 equals to −1 at the ulp position of the aligned addend 83, if a rounding correction is required, i.e., if the rounding correction rC is not zero, being equivalent to the potential correction term 93, bits padded with 1. Thus, the rounding correction 92, −rC, can be generated by half-decoding of the aligner shift amount.

Figure 6:
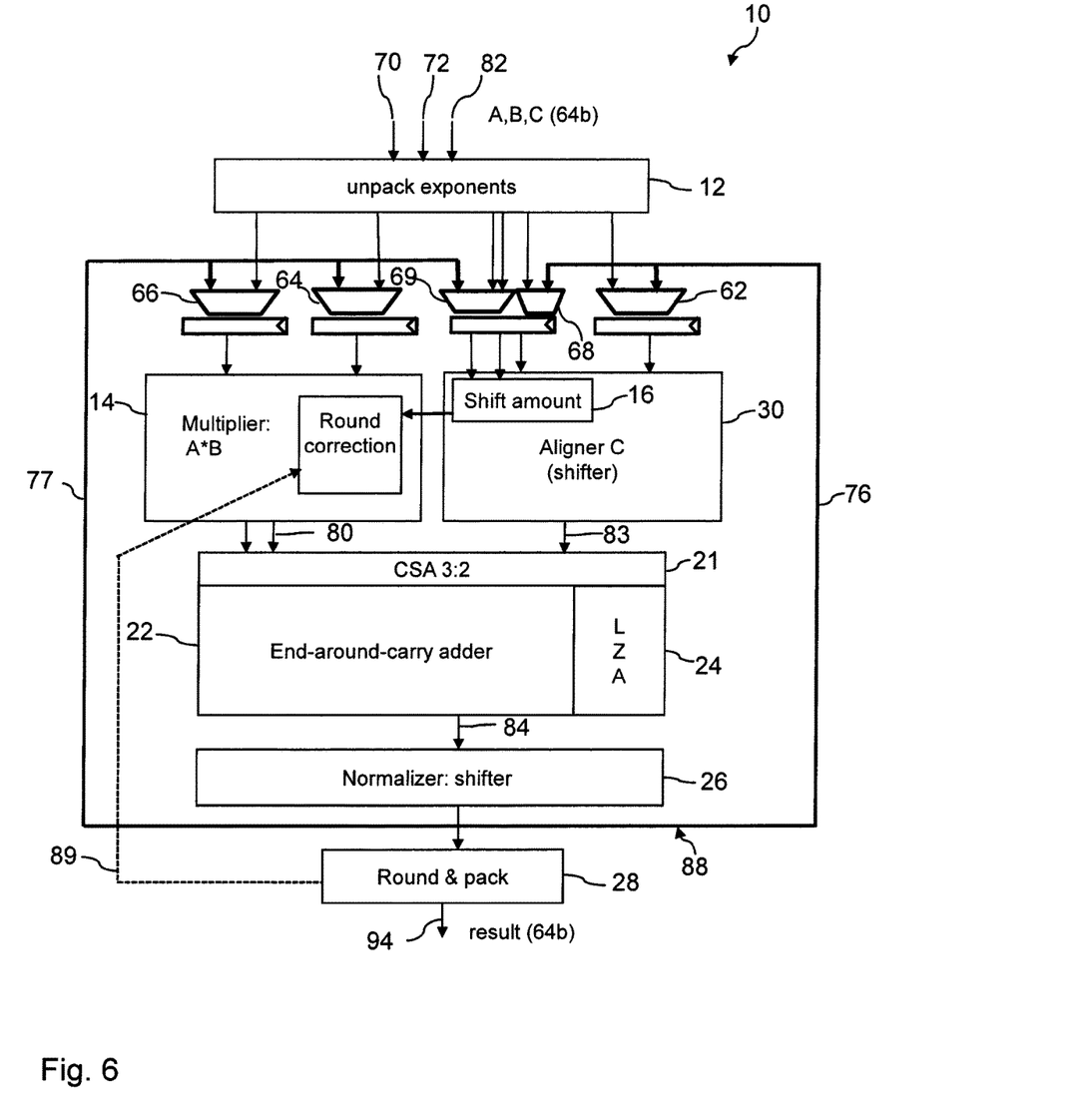
FIG. 6 a block diagram of an FMA unit according to an embodiment of the invention.

In FIG. 6, a block diagram of an FMA unit 10 according to an embodiment of the invention is shown. The FMA unit 10 is configured to operate on the addend 82, the multiplier 70, and the multiplicand 72, and includes means for receiving as the addend 82 an unrounded result of a prior operation executed in the unit via an early result feedback path 76, namely a multiplexer or a select component with the aligner 30; means for performing an alignment shift of the unrounded addend 82 on an unrounded exponent and an unrounded mantissa 88, namely the aligner 30; and means for performing a rounding correction for the addend 82 in parallel to the actual alignment shift, the means being responsive to an enabling by a rounding-up signal 89.

The rounding signal 89 gets sent from the rounder 28 back to the FMA unit 10 as an input. For this purpose, means are foreseen to receive this rounding-up signal 89 to enable the rounding correction. This enabling could be done by a select circuit, e.g., a multiplexer.

For this purpose, the FMA unit 10 comprises an unpack component 12, an aligner 30, e.g., a sum-addressed shifter, a multiplier 14, an adding unit comprising a carry-save-adder 21 and an end-around-carry adder 22 with a leading zero anticipator 24, a normalizer 26 as well as a rounding & packing component 28. Feedback paths 76, 77 are forwarding unrounded results back to the aligner 30 as well as to the multiplier 14. The addend 82, as well as the product terms comprising the multiplier 70 and the multiplicand 72, are fed to the unpack unit 12 in 64 bit lengths for double precision format. The addend 82 is conveyed to the aligner 30 via the multiplexer 62, which selects between the mantissa of the unpacked operand C and the mantissa of forwarded unrounded result 88, whereas the product terms 70, 72 are conveyed to the multiplier 14 via the multiplexers 66 and 64, which select between the mantissa of the unpacked operands A and B and the mantissa of the forwarded unrounded result 88. The exponents of the operands A, B, and C are conveyed to the shift amount calculation logic 16 of the aligner 30 via the multiplexers 68 and 69 which select between the exponents provided by the unpacker 12 or the forwarded exponent of the unrounded result 88. The aligner 30 is working with a 163 bit width, and the multiplier 14 with a 106 bit width. The aligner 30 shifts the addend 82 according to the difference in the exponents of the addend 82 and the product 80. The shifted addend 82 and the product 80 are conveyed to the adders 21, 22 in order to be added for the final sum of the FMA process. The normalize shifter 26 normalizes the mantissa of the sum from 163 bits to 55 bits. Thus, this unrounded mantissa 88 can be forwarded to the aligner 30 or the multiplier 14 for further calculations of a further FMA computation via feedback paths 76 or 77, respectively. The prior operation is at least one of an addition or a multiplication.

In case a forwarding of the final sum is not required, the sum is rounded and packed in the round & pack component 28 in order to get the final result 94 in a 64 bit double precision width.

Figure 7:
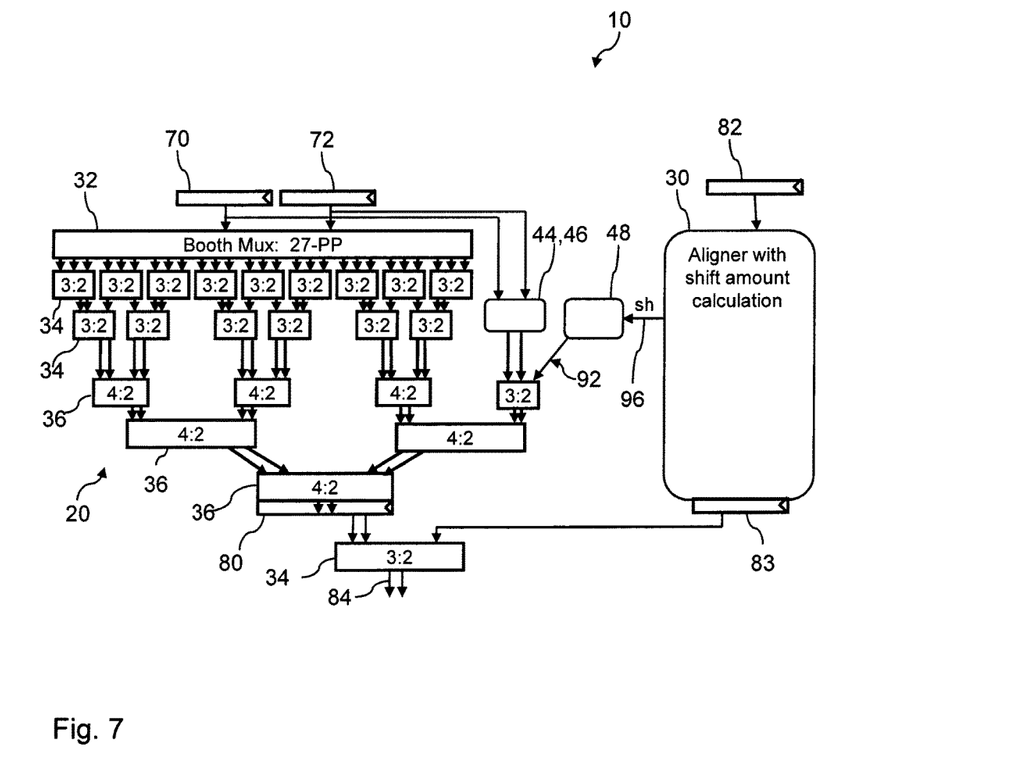
FIG. 7 a block diagram of an FMA unit with data flow supporting unrounded forwarding of correction terms according to an embodiment of the invention.

FIG. 7 depicts a block diagram of an FMA unit 10 with data flow supporting unrounded forwarding into all operands and applying correction terms according to an embodiment of the invention as a possible implementation of a 64 bit binary floating-point unit. Yet any type of floating-point unit, configured to perform an FMA process, may be used for applying aspects of the invention. FIG. 7 explains how the rounding corrections may be integrated into the aligner 30 and adder 20.

The product terms 70, 72 are fed to a booth multiplexer 32, which further conveys the data to a multiplier reduction tree 20 comprising a number of 3:2 carry save adders 34, as well as 4:2 carry save adders 36. The addend 82 is fed to the aligner 30 for calculating the shift amount 96 and aligning the addend 82. The aligner is implemented, e.g., as a sum-addressed shifter.

Means are provided for performing the rounding correction for the addend 82 by a correction term 92 applied to a multiplier reduction tree 20. The correction term 92 is obtained by applying a decode function to a shift amount 96 in case of an effective addition and/or by applying a half-decode function to the shift amount 96 in case of an effective subtraction.

A circuit generating the correction term 92 for the addend 82 based on the shift amount 96 as the means for performing the rounding correction for the addend 82 in parallel to the actual alignment shift is provided, where a correction term 92 based on incrementing an unrounded intermediate result of the prior operation is generated. The correction term 92 for the addend 82 is aligned with the same shift amount 96 as the addend 82.

Increments 44, 46 are determined for the correction terms 92 of the product terms 70, 72 and conveyed in the multiplier reduction tree 20 in order to get the product 80, as well as an increment 48 for the addend 82, which is determined based on the shift amount 96 calculated by the aligner 30.

Means for supporting multiple floating-point precisions are provided, wherein the value of the correction term 92 is adapted to support unrounded forwarding for a result of any of the supported precisions. The shift amount 96 can be in binary or unary or any other representation.

The shifted addend 83 as the output of the aligner 30 is then added to the product 80 in order to get the final sum 84.

The sum 84 or an absolute difference between the addend 82 and a product 80 of the multiplier 70 and the multiplicand 72 is calculated including sticky bits 54 (see FIG. 3) in order to calculate the correction term 92 based on the sticky bits 54 of the sum 84 or the absolute difference.

Figure 8:
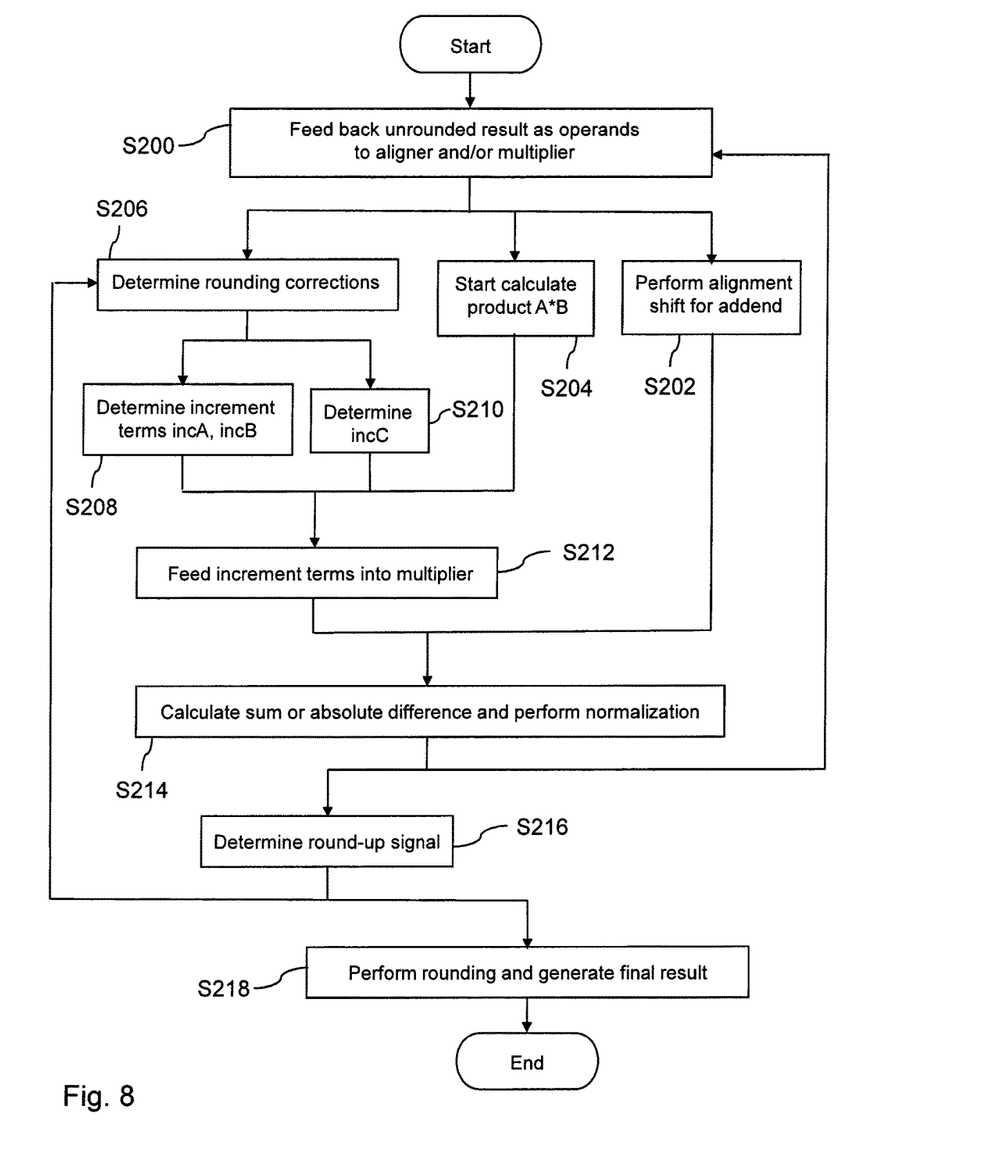
FIG. 8 a flowchart for unrounded forwarding into the operands of a floating-point unit according to an embodiment of the invention.

In FIG. 8, a flowchart for unrounded forwarding into the operands of a floating-point unit according to an embodiment of the invention is shown, explaining aspects of the method for performing binary floating point arithmetic calculations in a binary fused multiply-add floating-point unit in a general outline. The method, configured to operate on an addend C, a multiplier A, and a multiplicand B, comprises, e.g., receiving as the addend C an unrounded result of a prior operation executed in the unit via an early result feedback path; performing an alignment shift of the unrounded addend C on an unrounded exponent and an unrounded mantissa; and performing a rounding correction for the addend C in parallel to the actual alignment shift, the rounding correction being enabled by a rounding-up signal.

The flow for one or more aspects starts with feeding back the unrounded result to the multiplier and aligner in step S200, which can for each operand be configured to either select the unrounded result from a prior multiply, add, or multiply-add operation or the regular operand A, B, and C. Next, performing the alignment shift of the addend in step 202 in parallel to generating the product A*B with all potential rounding corrections in steps S204 to S212. The alignment shift may be performed by a sum-addressed shifter. The parallel branches step S202 and S204 to S212 are then joined in step S214 where the normalized unrounded result is generated by adding or subtracting the values of the product A*B, which includes the correction terms, and the aligned addend C and normalizing the sum or absolute difference based on the number of leading zeros. The sum or the absolute difference between the addend and the product of the multiplier and the multiplicand is calculated including sticky bits. The unrounded result generated in step S214 can then be forwarded to step S200 of a subsequent instruction; it also gets passed on to step S216 which performs the rounding decision and generates the round-up signal. This round-up signal can be forwarded to step S206 of a subsequent instruction. Step S218 then generates the final rounded result based on the unrounded result of step S214 and the round-up signal of step S216.

For generating the product A*B with all potential rounding corrections, the multiplier starts the calculation of the product A*B in step S204, and in parallel, step S206 determines for the two product terms A, B and for the addend C whether a rounding correction is needed based on a round-up signal received from prior instructions. Then, increment terms incA and incB for the product terms A, B are determined in step S208, as well as increment term incC for the addend C in step S210. The correction and increment term incC is aligned in the same way as the addend C. Term incC may be obtained by applying a decode function to the shift amount in the case of an effective addition and obtained by applying a half-decode function to the shift amount in the case of an effective subtraction. In step S212, the increment terms are fed into the multiplier reduction tree and the multiplication with all rounding correction is finished.

Figure 9:
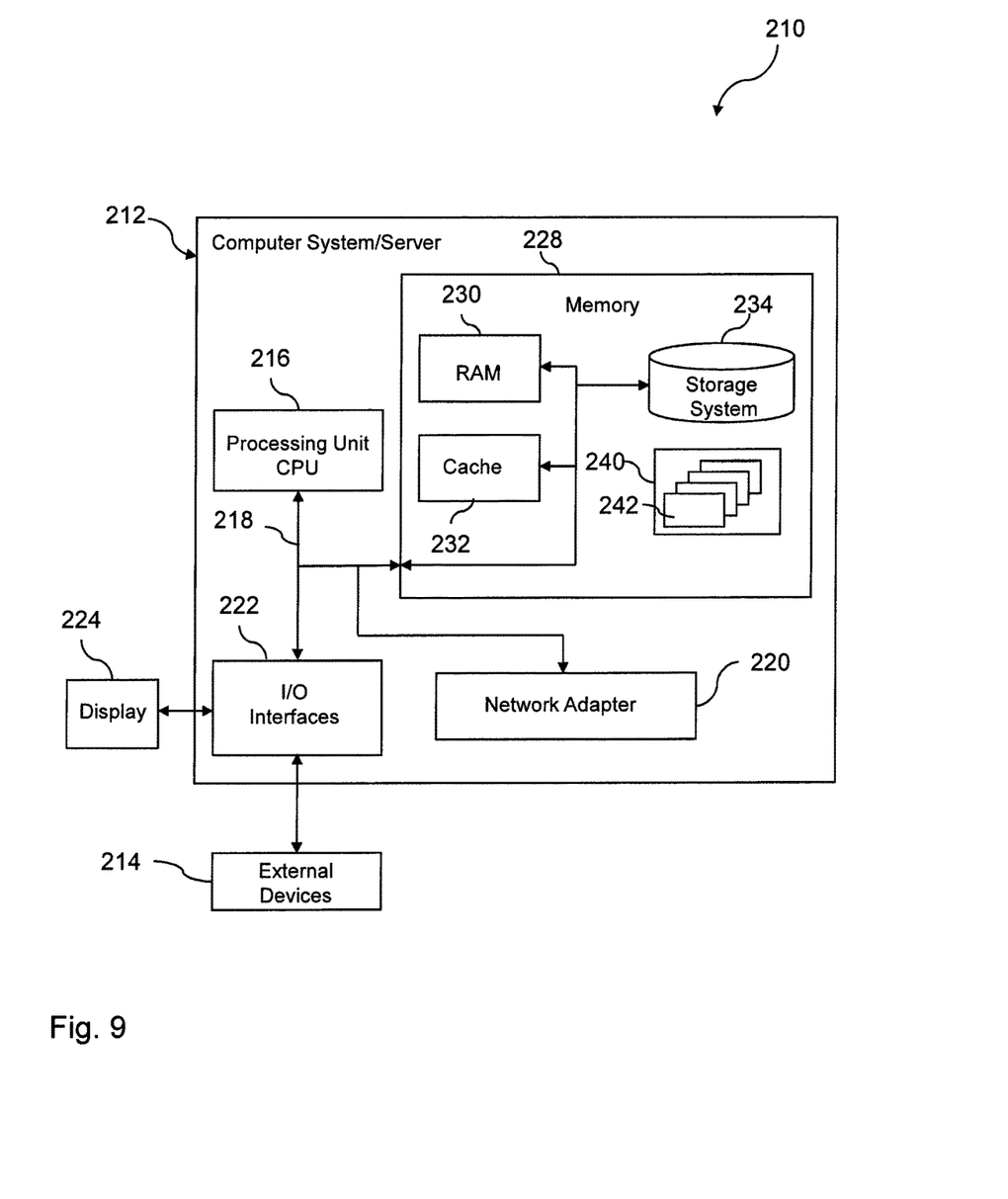
FIG. 9 an example embodiment of a data processing system for executing a method according to one or more aspects of the invention.

Referring now to FIG. 9, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212;

and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, a binary fused multiply-add floating-point unit is provided, configured to operate on an addend, a multiplier, and a multiplicand, the unit comprising: means for receiving as the addend an unrounded result of a prior operation executed in the unit via an early result feedback path; means for performing an alignment shift of the unrounded addend on an unrounded exponent and an unrounded mantissa; and means for performing a rounding correction for the addend in parallel to the actual alignment shift, the means being responsive to an enabling by a rounding-up signal.

The binary fused multiply-add floating-point unit (in the following abbreviated as FMA unit), in one or more aspects, exhibits a significantly reduced latency of the FMA unit compared to FMA units according to the state of the art.

Due to a structure of a multiply-add based FPU according to state of the art, the addend gets aligned relative to the product and can stick-out to the right or the left relative to the product, depending if the addend is larger or smaller than the product. Aligner components and multiplier components are acting in parallel.

The binary fused multiply-add floating-point unit of one or more aspects avoids certain disadvantages of a commonly used split-path concept for FMA, which is very useful for add-operations. Such an FPU has two parallel data paths, a near path and a far path. For the far path, the addend is either much larger than the product, or the product is much larger than the addend. In the near-path case, the addend and product are very close to each other. This kind of case split allows optimizations for each data path. However, when compared to the classical approach, it only saves a few logic stages. Another drawback of this method is that the case split only works well for normal operands and results. Subnormal operands and results usually require software support.

The binary fused multiply-add floating-point unit of one or more aspects avoids certain disadvantages of another concept which uses aggressive forwarding techniques to already feed-back the intermediate results into dependent operations rather than waiting for the final rounded and packed answer, as, e.g., a chained floating-point multiplier and adder to support FMA. For this structure, special unrounded forwarding of the product at the end of the adder-stage into the add-operation is realized. This process is successful, if operands and results are normal; values being not normalized require software support. However, this concerns forwarding within the FMA operation and not to a subsequent operation. Fast forwarding from addition to multiplication and from addition to both operands of another addition is not supported, as it would be needed for sending data from one FMA process to the next one. When the multiplication and addition are not fused, the multiplication requires rounding. Such an asymmetrical kind of forwarding usually causes more complexity to the instruction sequencer.

Further schemes known in the art support forwarding the rounded result in an internal format prior to packing it into IEEE data format. That saves some logic delays on the packing in the producing operation and some logic delays on the unpacking in the receiving operation. This forwarding is supported to all three operands of an FMA operation. Further schemes known in the art, like the one disclosed in U.S. Pat. No. 8,671,129 B2, are even more aggressive, by forwarding the result already prior to rounding. To stay IEEE compliant, some rounding correction is required.

This IEEE-standard compliance is achieved in the prior art by computing the product and the aligner shift amount based on the unrounded result, and applying correction terms for the product. However, for the actual shifting of the addend, the rounded result is required. Thus, the start of the actual shifting has to be delayed till the rounded result is available, which becomes the timing critical path of the FPU. Thus, the start of the alignment shift has to be delayed since a true solution for unrounded forwarding into the addend is not known.

The FMA unit of one or more aspects overcomes the necessity of delaying the alignment shift until the rounded result is available. The FMA unit allows for truly unrounded forwarding into the addend, by providing a correction term for the addend and not just for the product. Thus, the latency of a binary FMA based FPU according to aspects of the invention is significantly reduced.

As means for receiving as the addend the unrounded result of a prior operation executed in the unit via the early result feedback path, a multiplexer or a select circuit may be used, which is capable of selecting between two or more modes of input data. As means for performing the alignment shift of the unrounded addend on the unrounded exponent and the unrounded mantissa, any electronic circuit with functions for determining and performing a respective shift amount may be used. Further as means for performing the rounding correction for the addend in parallel to the actual alignment shift, where the means are responsive to an enabling by the rounding-up signal, any electronic circuit with functions for determining a necessary increment of the addend depending on an alignment shift situation may be used. A rounding correction for the addend may be generated by decoding a limited shift amount determined by an aligner component of the FMA unit and enabling it based on the rounding-up signal. A rounding-up signal may be generated by the prior instruction in the rounding logic of the FMA unit.

According to one or more aspects of the invention, forwarding may be performed from any operation back into the add term which requires alignment shift.

Optionally, the FMA unit may also have means to receive unrounded operands for the multiplier and multiplicand.

According to an embodiment, the FMA unit further may comprise means for performing the rounding correction for the addend by a correction term applied to a multiplier reduction tree. Thus, it is possible to perform the rounding correction for the addend parallel to performing the alignment shifting of the addend. The correction term may be conveyed to an input of an adder unit of the multiplier component of the FMA unit, triggered by the rounding-up signal. Such an adder unit e.g. may be represented favorably by a carry-save-adder unit.

According to an embodiment, the correction term further may be obtained by applying a decode function to a shift amount in case of an effective addition and/or by applying a half-decode function to the shift amount in case of an effective subtraction.

There are two aspects which make the rounding correction for the addend more complicated than for the product. First, the addend gets aligned relative to the product, i.e., it gets shifted, and the least significant bit (lsb) position of the aligned addend depends on the exponent difference of the product and addend. Thus, the rounding correction also is to be shifted. Secondly, the addend gets added or subtracted from the product, and therefore the correction term either is to be added or subtracted as well. The position of the aligned addend can, for example, be derived from the shift amount by a decoder.

For an effective addition of an addend, the rounding correction is added and may be calculated according to:

S=P+C+rC, where S is an effective sum, P is the mantissa of a product term, C is the mantissa of an addend aligned to the product and rC is the correction term. The correction term rC may be calculated as:

$rC=0$ or $rC=1*2^{-52}*2^{(ec-ep)}$ for double precision calculations, where ec is the exponent of the addend and ep is the exponent of the product term. rC is aligned in the same way as the addend C, which means it is aligned to the least significant bit of C. The position of rC for alignment can be generated by decoding the aligner shift amount.

For an effective subtraction of an addend, the addend can be larger or smaller than the product, thus a difference D without a rounding correction may be calculated according to:

$D=|P-C|=P-C=P+!C+\text{ulp}$, if $P>C$, else $D=-(P-C)=!(P+!C)$, where !C is the negation of C and where ulp is the unit in last place of the difference D.

Further, the rounding correction may be calculated according to:

$D=|-(C+rC)|=P-C-rC=(P-rC)+!C+\text{ulp}$, if $P>C+rC$, else $D=-(P-C-rC)=!((P-rC)+!C)$.

Thus, the rounding correction −rC can be generated by half-decoding of the aligner shift amount.

According to an embodiment, the alignment shift further may be performed by a sum-addressed shifter. Sum-addressed shifters, generally known in the art, allow to combine the shift amount calculation and the actual shifting. With a conventional FMA unit, the alignment shift has to wait for the rounded result to be available. The FMA unit of one or more aspects may use the unrounded mantissa for shifting, and therefore, can make full use of the latency advantage of sum-addressed shifters. It applies the adder correction in the multiplier tree while the alignment shift is already ongoing. Therefore, a sum-addressed shifter may contribute to the advantages of the inventive FMA unit.

According to an embodiment, the FMA unit may further comprise means for supporting multiple floating-point precisions, wherein the value of the correction term is adapted to support unrounded forwarding for a result of any of the supported precisions. As the IEEE-754-2008 Standard for Binary Floating Point Arithmetic concerns a number of floating-point precisions, such as single, double or quadruple precision latency reductions is to be used for multiple precisions. The FMA unit of one or more aspects may be implemented in the different floating-point precisions and exhibits the favorable reduction in latency.

According to an embodiment, the prior operation may be at least one of an addition or a multiplication or a multiply-add operation. Operands to be forwarded to the input of the FMA unit may be a result of a prior addition, as well as a multiplication. The forwarding of unrounded results into all three operands of a new calculation concerning reduction of latency in performing the FMA process may be realized in any case.

According to an embodiment, the FMA unit may further comprise at least a multiplexer or a select circuit as the means for receiving as the addend the unrounded result of a prior operation. Multiplexers or other select circuits which are capable to distinguish between at least two different kinds of input are favorably used as input stages of multipliers or aligners. Thus, an unrounded result of a prior operation may be conveyed to such input stages.

According to an embodiment, the FMA unit may further comprise a circuit enabled for calculating the shift amount and shifting an operand as the means for performing the alignment shift of the unrounded addend. This operation may be performed on an unrounded exponent and an unrounded mantissa for making full use of the FMA unit of one or more aspects and taking full advantage of the reduction in latency of the floating-point operation.

According to an embodiment, the FMA unit may further comprise a circuit generating the correction term for the addend based on the shift amount as the means for performing the rounding correction for the addend in parallel to the actual alignment shift. The correction term may be calculated based on an increment term of the addend and based on a decoded or half-decoded shift amount. The correction term then may be conveyed to an input stage of the multiplier tree of the FMA unit in parallel to the aligner performing the actual alignment shift on the addend.

According to an embodiment, the FMA unit may further comprise generating the correction term based on incrementing an unrounded intermediate result of the prior operation. The mantissa of the unrounded intermediate result may be incremented by a value of 1 in order to get a result mantissa and be able to decide if a correction term may be needed when forwarding the result or not.

According to an embodiment, the correction term for the addend may further be shifted with the same shift amount as the addend. The addend is added or subtracted from the product, and therefore, the correction term either is to be added or subtracted as well. For the effective addition, the rounding correction is added. The position, e.g., can be derived from the shift amount by a decoder.

According to an embodiment, a sum or an absolute difference between the addend and a product of the multiplier and the multiplicand may be calculated including sticky bits. As a modification of a conventional FMA unit, the sum or difference may be calculated on all bits of the operands, including the sticky bits. Therefore, the sticky bits are calculated on the result of the adder stage of the multiplier tree of the FMA unit. Adjustments of the sticky logic of a conventional FMA unit accordingly may be performed in order to take full advantage of this embodiment.

According to an embodiment, the correction term may be calculated based on the sticky bits of the sum or the absolute difference. The sticky bits may be calculated after adding the addend shifted according the shift amount determined by the aligner circuit to the product term. The sticky bits may then further be reduced by an OR circuit to a single bit for rounding the final result of the FMA operation.

Further, a method for performing binary floating point arithmetic calculations in a binary fused multiply-add floating-point unit is provided, configured to operate on an addend, a multiplier, and a multiplicand. The method comprises receiving as the addend an unrounded result of a prior operation executed in the unit via an early result feedback path; performing an alignment shift of the unrounded addend on an unrounded exponent and an unrounded mantissa; and performing a rounding correction for the addend in parallel to the actual alignment shift, the rounding correction being enabled by a rounding-up signal.

The method overcomes the necessity of delaying the alignment shift until the rounded result of an FMA unit is available. The method allows for truly unrounded forwarding into the addend, by providing a correction term for the addend and not just for the product. Thus, the latency of a binary FMA process according to aspects of the invention is greatly reduced.

According to an embodiment, further, the rounding correction for the addend may be performed by a correction term applied to a multiplier reduction tree of the unit. Thus, it is possible to perform the rounding correction for the addend parallel to performing the alignment shifting of the addend. The correction term may be conveyed to an input of an adder unit of the multiplier component of an FMA unit, triggered by the rounding-up signal.

According to an embodiment, further, the correction term may be obtained by applying a decode function to a shift amount in case of an effective addition; and/or by applying a half-decode function to the shift amount in case of an effective subtraction.

For an effective addition of an addend the rounding correction is added and may be calculated according to:

S=P+C+rC, where S is an effective sum, P is the mantissa of a product term, C is the mantissa of an addend aligned to the product and rC is the correction term. Then, rC may be calculated as:

$rC=0$ or $rC=1*2^{-52}*2^{(ec-ep)}$ for double precision calculations, where ec is the exponent of the addend and ep is the exponent of the product term. rC is aligned in the same way as the addend C, which means it is aligned to the least significant bit of C. The position of rC for alignment can be generated by decoding the aligner shift amount.

For an effective subtraction of an addend, the addend can be larger or smaller than the product, thus a difference D without rounding correction may be calculated according to:

$$D=|P-C|=P-C=P+!C+ulp, \text{ if } P>C, \text{ else}$$

D=−(P−C)=!(P+!C), where !C is the negation of C and where ulp is the unit in last place of the difference D.

Further, the rounding correction may be calculated according to:

$$D=|P-(C+rC)|=P-C-rC=(P-C)+!C+ulp, \text{ if } P>C+rC, \text{ else}$$

$$D=-(P-C-rC)=!((P-rC)+!C).$$

Thus, the rounding correction −rC can be generated by half-decoding of the aligner shift amount.

According to an embodiment, further, the alignment shift may be performed by a sum-addressed shifter. Sum-addressed shifters allow to combine the shift amount calculation and the actual shifting. According to the method of one or more aspects, the adder correction is applied in the multiplier tree of the FMA unit, while the alignment shift is already ongoing.

According to an embodiment, further, multiple floating-point precisions may be supported, wherein the value of the correction term being adapted to support unrounded is forwarded for a result of any of the supported precisions. According to the IEEE-754-2008 Standard for Binary Floating Point Arithmetic, single, double or quadruple floating-point precision may be supported.

According to an embodiment, the prior operation may be at least one of an addition or a multiplication or a multiply-add operation. Operands to be forwarded to the input of the FMA unit may, in accordance with one or more aspects, be a result of a prior addition as well as a multiplication.

According to an embodiment, the correction term may be generated based on incrementing an unrounded intermediate result of the prior operation. The mantissa of the unrounded intermediate result may be incremented by a value of 1 in order to get a result mantissa and be able to decide if a correction term may be needed when forwarding the result or not.

According to an embodiment, a sum or an absolute difference between the addend and a product of the multiplier and the multiplicand may be calculated including sticky bits. The sum or difference may be calculated on all bits of the operands, including the sticky bits. Therefore, the sticky bits are calculated on the result of the adder stage of the multiplier tree of the FMA unit.

According to an embodiment, the correction term may be calculated based on the sticky bits of the sum or the absolute difference. The sticky bits may be calculated after adding the addend shifted according to the shift amount determined by the aligner circuit to the product term. The sticky bits may then further be reduced by an OR circuit to a single bit for rounding the final result of the FMA operation.

Further, a computer program product is provided for performing binary floating point arithmetic calculations in a binary fused multiply-add floating-point unit, configured to operate on an addend, a multiplier, and a multiplicand. The computer program product comprises a computer readable storage medium having program instructions embodied therewith, the program instructions executable by the computer systems to cause the computer systems to perform a method comprising: receiving as the addend an unrounded result of a prior operation executed in the unit via an early result feedback path; performing an alignment shift of the unrounded addend on an unrounded exponent and an unrounded mantissa; and performing a rounding correction for the addend in parallel to the actual alignment shift, the rounding correction being enabled by a rounding-up signal.

Further, a data processing system for execution of a data processing program is provided, comprising computer readable program instructions for performing a method described above.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A modified floating-point fused multiply-add unit configured to operate on an addend, a multiplier, and a multiplicand and configured to perform a method, the method comprising:
   receiving as the addend an unrounded result of a prior operation executed in the unit via an early result feedback path;

performing an alignment shift by a shift amount, of the addend on an unrounded exponent and an unrounded mantissa;

in parallel to performing the alignment shift, performing a rounding correction for the addend by a correction term applied to a multiplier reduction tree of the unit, the rounding correction being enabled by a rounding-up signal; and performing at least one of:
obtaining the correction term by applying a decode function to the shift amount, based on an effective addition; or
obtaining the correction term by applying a half-decode function to the shift amount, based on an effective subtraction.

2. The unit according to claim 1, wherein multiple floating-point precisions are supported, and wherein a value of the correction term is adapted to support unrounded forwarding for a result of one or more of the supported multiple floating-point precisions.

3. The unit according to claim 1, wherein the method further comprises generating the correction term based on incrementing an unrounded intermediate result of the prior operation.

4. The unit according to claim 1, wherein the performing the alignment shift further comprises performing the alignment shift by a sum-addressed shifter.

5. The unit according to claim 1, wherein the prior operation is at least one of an addition, a multiplication, or a multiply-add operation.

6. The unit according to claim 1, wherein a sum or an absolute difference between the addend and a product of the multiplier and the multiplicand is calculated, the sum or the absolute difference including sticky bits.

7. The unit according to claim 6, wherein the method further comprises calculating a correction term used by the performing the rounding correction based on the sticky bits of the sum or the absolute difference.

8. The unit according to claim 1, wherein the performing the alignment shift comprises calculating the shift amount and shifting an operand.

9. A computer program product for performing binary floating point arithmetic calculations in a modified floating-point fused multiply-add unit configured to operate on an addend, a multiplier, and a multiplicand, the computer program product comprising:

a computer readable storage medium readable by a processing circuit and storing instructions for execution by the processing circuit for performing a method comprising:

receiving as the addend an unrounded result of a prior operation executed in the unit via an early result feedback path;

performing an alignment shift by a shift amount, of the addend on an unrounded exponent and an unrounded mantissa;

in parallel to performing the alignment shift, performing a rounding correction for the addend by a correction term applied to a multiplier reduction tree of the unit, the rounding correction being enabled by a rounding-up signal; and performing at least one of:
obtaining the correction term by applying a decode function to the shift amount, based on an effective addition; or
obtaining the correction term by applying a half-decode function to the shift amount, based on an effective subtraction.

10. The computer program product according to claim 9, wherein the prior operation is at least one of an addition, a multiplication, or a multiply-add operation.

11. The computer program product according to claim 9, wherein a sum or an absolute difference between the addend and a product of the multiplier and the multiplicand is calculated including sticky bits.

12. A modified floating-point fused multiply-add unit configured to operate on an addend, a multiplier, and a multiplicand and configured to perform a method, the method comprising:

receiving as the addend an unrounded result of a prior operation executed in the unit via an early result feedback path;

performing an alignment shift by a shift amount, of the addend on an unrounded exponent and an unrounded mantissa, wherein performing the alignment shift comprises calculating the shift amount and shifting an operand;

in parallel to performing the alignment shift, performing a rounding correction for the addend, the rounding correction being enabled by a rounding-up signal; and generating a correction term used by the performing the rounding correction based on the shift amount.

13. The unit according to claim 12, wherein the performing the alignment shift further comprises performing the alignment shift by a sum-addressed shifter.

14. The unit according to claim 12, wherein the prior operation is at least one of an addition, a multiplication, or a multiply-add operation.

15. The unit according to claim 12, wherein a sum or an absolute difference between the addend and a product of the multiplier and the multiplicand is calculated, the sum or the absolute difference including sticky bits.

16. The unit according to claim 15, wherein the method further comprises calculating a correction term used by the performing the rounding correction based on the sticky bits of the sum or the absolute difference.

17. The unit according to claim 12, wherein the performing the rounding correction further comprises performing the rounding correction for the addend by a correction term applied to a multiplier reduction tree of the unit.

* * * * *